Oct. 25, 1949.　　　　K. H. BUTLER　　　　2,486,112
BARIUM STRONTIUM LEAD SILICATE PHOSPHOR

Filed March 13, 1948　　　　　　　　　　　　　2 Sheets-Sheet 1

INVENTOR.
Keith H. Butler
BY
ATTORNEY

Patented Oct. 25, 1949

2,486,112

UNITED STATES PATENT OFFICE 2,486,112

BARIUM STRONTIUM LEAD SILICATE PHOSPHOR

Keith H. Butler, Marblehead, Mass., assignor to Sylvania Electric Products Inc., Salem, Mass., a corporation of Massachusetts Application March 13, 1948, Serial No. 14,687

4 Claims. (Cl. 252—301.4)

This invention relates to luminescent materials and more particularly to a barium-strontium lead silicate phosphor capable of excitation by short wavelength U. V. light.

An object of this invention is to provide a barium strontium lead silicate phosphor adapted to be used in the preparation of a blue fluorescent lamp or as the blue component in fluorescent lamps of other colors.

A further object is to provide a phosphor for use in sign tubing.

Further objects, advantages, and features will be apparent from the following specification when read in conjunction with the accompanying drawings in which.

In my co-pending application, Serial Number 725,779, filed February 1, 1947, I disclosed a barium lead silicate phosphor in which the lead served both as a color modifier and an activator. The color modification effected was an increase in the green emission and this was accomplished by varying the lead content.

The co-pending application of James G. Cassanos et al., Serial Number 755,116, filed June 17, 1947, now Patent No. 2,467,810, discloses a barium-magnesium-lead silicate phosphor in which the color of the fluorescent light is modified by a partial substitution of magnesium for barium. With these phosphors, the general effect of the magnesium is to make the color of the fluorescence more green. This partial substitution also makes it possible to obtain good phosphors with a lower content of lead and of silicic acid than is possible with lead-activated barium silicate phosphors with no magnesium present in the composition.

In my present invention I have found that, although strontium lead silicates are either non-fluorescent or fluoresce very weakly, a partial replacement of barium by strontium in a barium lead silicate gives a highly desirable fluorescent material, which is generally less green than barium lead silicate and for certain compositions bluer than calcium lead tungstate.

Those compounds of barium, lead and silicic acid in which about 1.5 mols of silicic acid are available for combination with the barium, after allowing 1 mol of silicic acid for each mol of lead present, may be changed from blue-green fluorescence characteristic of the barium silicate compounds to a blue fluorescence, by the introduction of strontium as a partial replacement for barium. As a result of this substitution, phosphors of a clear blue color can be made having a higher efficiency than is possible to obtain with barium silicate and lead alone. Blue fluorescent lamps made with calcium lead tungstate are usually a pale blue with a violet or purple undertone. The color of fluorescent lamps made with barium strontium lead silicate in accordance with certain preferred aspects of my invention is a more saturated blue devoid of the sharp violet or purple undertone which characterizes the lamps made with calcium lead tungstate.

Figure 1:
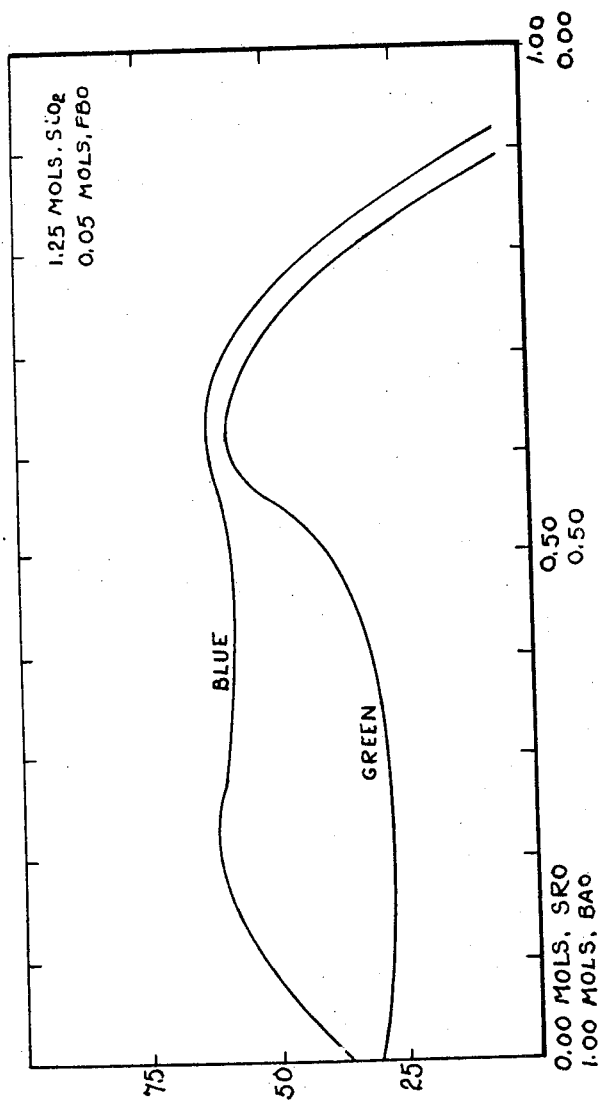
Figure 1 shows the visible blue and green light emission of phosphors with 0.05 mol PbO, 1.25 total mols $SiO_2$, and varying ratio of BaO to SrO.

Useful fluorescent materials can be made over a wide range of composition. The ratio of the number of mols of barium oxide to the sum of the number of mols of barium oxide plus strontium oxide may vary from 1.00 to about 0.20. As may be seen from a study of Figure 1, the ratio of strontium to the sum of strontium and barium should not exceed about 0.80. When this limit is exceeded the powder displays crystal structures characteristic of strontium silicates and the fluorescence falls off very rapidly between 0.8 and 1.0 mol of strontium, becoming practically zero when no barium is present.

The lead content may be varied over a relatively wide range. For example, I have found that the practical lead oxide content may vary from 0.01 to 0.60 mol or even higher. Since, as I indicated in my co-pending application, Serial Number 725,779, filed February 1, 1947, the lead serves as a color modifier as well as an activator, the quantity of lead oxide used will be determined in large part by the degree of activation and shade of color desired in a given case.

For example, when the ratio of strontium to the sum of strontium plus barium is less than 0.10, and the $SiO_2$ content is maintained at about 1.5 net mols, the lead content should be at least 0.04 mol in order to obtain reasonably good activation. However, as the barium is decreased and the strontium is increased the lead content may be lowered. For example, with 0.50 mol of strontium the lead content may be reduced to 0.01 mol and still have reasonably good activation. In cases where it is desirable to have the lead modify the color as well as to effect activation, larger amounts of lead are necessary. However, when more than 0.60 mol of lead oxide is used, there is a gradual loss in efficiency of activation.

Figure 2:
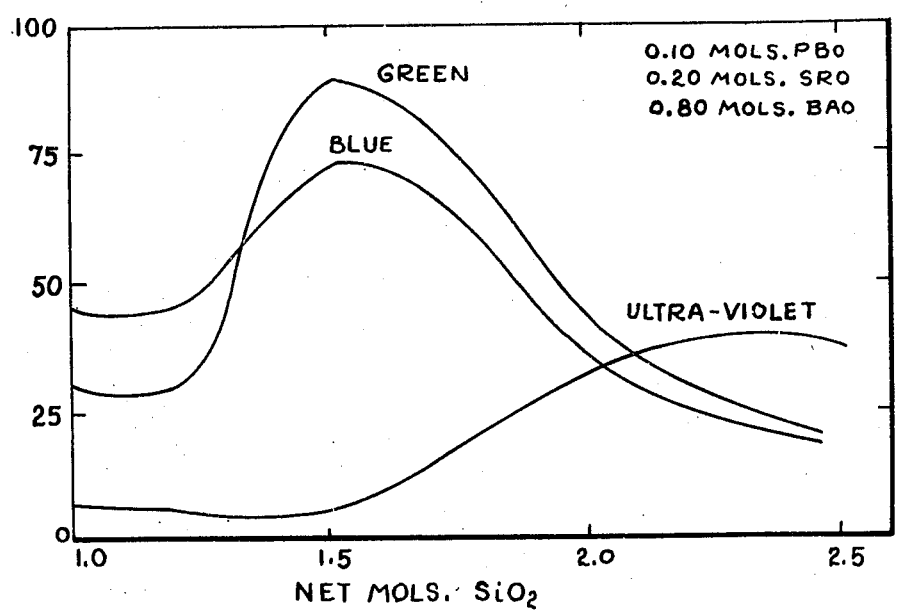
Figure 2 shows the visible blue and green light and ultra-violet light emission of phosphors with 0.10 mol PbO, 0.20 SrO, 0.80 BaO, and varying $SiO_2$.
Figure 3:
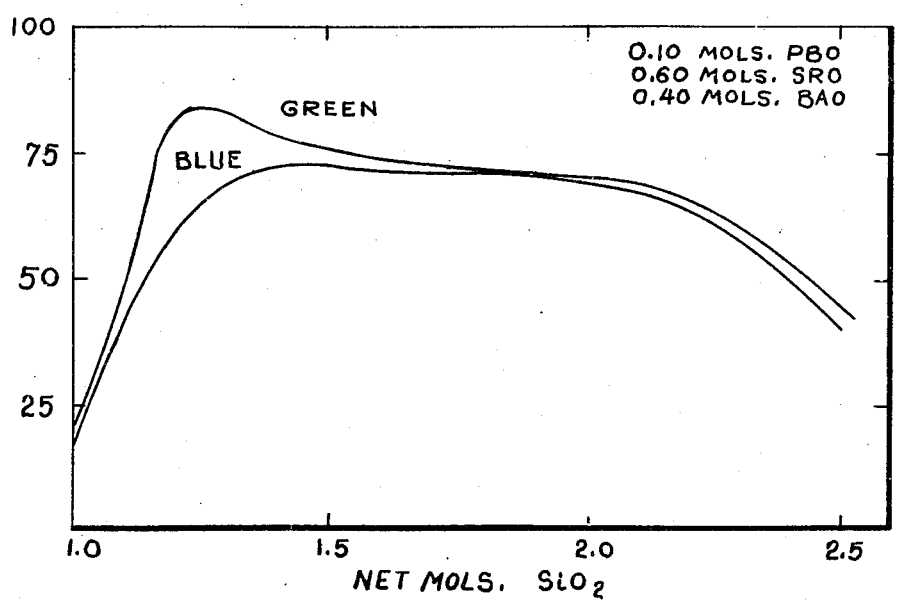
Figure 3 shows the visible blue and green light emission of phosphors with 0.10 mol PbO 0.60 SrO, 0.40 BaO and varying $SiO_2$.

As may be seen from a study of Figures 2 and 3, the silicic acid content may be varied from 1.0 to 2.5 "net mols" of $SiO_2$ per mol of barium oxide plus strontium oxide. The term "net mols" refers to the number of mols of $SiO_2$ per mol of barium oxide plus strontium oxide after subtracting one mol of $SiO_2$ for each mol of lead oxide used in the raw material blend. If the net mols of $SiO_2$ is below 1, the phosphors become discolored and the fluorescence drops. If more than 2.5 net mols of $SiO_2$ are used the amount of the visible light emitted drops.

Barium-strontium-lead silicate phosphors of the following compositions are examples of fluorescent materials which are high in blue output:

(a)
0.8 mol BaO
0.2 mol SrO
0.03 mol PbO
1.2 net mols $SiO_2$ (b)
0.4 mol BaO
0.6 mol SrO
0.08 mol PbO
1.2 net mols $SiO_2$ (c)
0.85 mol BaO
0.15 mol SrO
0.13 mol PbO
1.5 net mols $SiO_2$ In the preparation of these phosphors I have used one mol of $SiO_2$ for each mol of Pb present and express the difference between the total mols of $SiO_2$ and the amount required to form lead metasilicate, $PbO.SiO_2$, as the net $SiO_2$ which is free to combine with the barium and strontium to form an alkaline earth silicate.

In preparing the phosphors of my invention I may, for example, wet mill in water for from 2 to 16 hours sufficient quantities of silicic acid, barium carbonate, lead carbonate and strontium carbonate to make the desired composition. After milling, the mixture is filtered and dried. The cake is crushed or dry ground and then fired in silica vessels for from 2 to 16 hours at a suitable temperature. The firing temperature depends to a considerable extent on the composition of the phosphor and may vary from about 1300° F. to about 2200° F. Other methods of preparing fluorescent phosphors known to those skilled in the art may be employed without departing from the spirit or scope of my invention. Compounds other than carbonates, such as oxides, or hydroxides may be employed as sources of barium, strontium or lead.

I have found it advantageous to use a catalyst, such as barium fluoride for example, in amounts from 0.02 to 0.5% by weight based on the total weight of raw materials used. The function of this catalyst is to accelerate the reaction of the raw materials and it permits firing at a lower temperature than would be otherwise required for development of maximum output of fluorescent light. However, such a catalyst is not essential to the preparation of these phosphors and its use may be omitted if desired.

In preparing a phosphor of approximately the following composition: 0.80 mol BaO, 0.20 mol SrO, 0.075 mol PbO and 1.5 mol $SiO_2$, I use about 320 grams of barium carbonate, about 60 grams of strontium carbonate, about 40 grams of lead carbonate, about 4 grams of barium fluoride and about 220 grams of silicic acid. This mixture may be wet milled in about 1800 cc. of water for about 8 hours. The resulting suspension may then be filtered, dried, and crushed. It is then charged into a silica vessel and fired 4 hours at about 1880° F. Blue fluorescent lamps made with this phosphor were clear blue in color, more saturated and less purple in tone than calcium lead tungstate.

What I claim:

1. A barium-strontium-lead silicate phosphor comprising about 0.85 mol BaO, about 0.15 mol SrO, about 0.13 mol PbO, and about 1.5 net mols $SiO_2$.

2. A barium strontium lead silicate phosphor having up to about 0.8 mol of strontium for each mol of barium plus strontium, between 0.01 mol to about 0.6 mol of lead, and between about 1 to about 2.5 net mols of silicic acid per mol of barium plus strontium.

3. A barium strontium lead silicate phosphor having up to about 0.8 mol of strontium for each mol of barium plus strontium, about 0.05 mol of lead, and about 1.25 net mols of silicic acid per mol of barium plus strontium.

4. A barium strontium lead silicate phosphor having about 0.6 mol of strontium, about 0.4 mol of barium, about 0.1 mol of lead and between about 1 to about 2.5 net mols of silicic acid per mol of barium plus strontium.

KEITH H. BUTLER.

REFERENCES CITED

The following references are of record in the file of this patent:

UNITED STATES PATENTS

| Number | Name | Date |
|---|---|---|
| 2,049,765 | Fischer | Aug. 4, 1936 |

FOREIGN PATENTS

| Number | Country | Date |
|---|---|---|
| 572,771 | Great Britain | Oct. 23, 1945 |